United States Patent [19]  
Pasinski et al.

[11] Patent Number: 4,707,855  
[45] Date of Patent: Nov. 17, 1987

[54] PERSONALIZED TELEPHONE SIGNALING CIRCUITRY AND DEVICE, AND METHODS OF CONSTRUCTING AND UTILIZING SAME

[75] Inventors: Ralph R. Pasinski; Sammy L. Ayers, Jr.; Warren C. Kocmond, Jr., all of Sunnyvale, Calif.

[73] Assignee: Nobell Inc., Sunnyvale, Calif.

[21] Appl. No.: 739,709

[22] Filed: May 31, 1985

[51] Int. Cl.$^4$ ............................................. H04M 1/00
[52] U.S. Cl. ..................................... 379/376; 379/387; 379/434
[58] Field of Search ................. 179/84 R, 84 T, 84 L, 179/81 R, 2 A, 2 R; 379/372, 373, 374, 375, 376, 387, 396, 442, 434, 52

[56] References Cited  
U.S. PATENT DOCUMENTS

| | | | |
|---|---|---|---|
| H. 000,118 | 9/1986 | Biggs et al. | 179/84 T |
| 2,929,883 | 3/1960 | Durbin et al. | 179/84 L |
| 3,412,213 | 11/1968 | McCay | 379/376 |
| 3,459,900 | 8/1969 | Alster et al. | 379/376 |
| 3,896,270 | 7/1975 | Kopec et al. | 379/376 |
| 4,046,970 | 9/1977 | Castleman | 379/376 |
| 4,379,210 | 4/1983 | Sparber | 179/84 L |
| 4,480,153 | 10/1984 | Festa | 179/84 T |

OTHER PUBLICATIONS  
"Technology Illustrated", Oct. 20, 1983.

Primary Examiner—James L. Dwyer  
Attorney, Agent, or Firm—Irving M. Weiner; Joseph P. Carrier; Pamela S. Burt

[57] ABSTRACT

A personalized telephone signaling device comprising a signaling portion preferably in the shape of a toy, animal or human figure with movable and/or sound-producing mechanisms, and an electrical circuit which activates and deactivates the signaling portion in response to signals in a telephone line.

13 Claims, 2 Drawing Figures

PERSONALIZED TELEPHONE SIGNALING CIRCUITRY AND DEVICE, AND METHODS OF CONSTRUCTING AND UTILIZING SAME

BACKGROUND OF THE INVENTION

1. Field of the Invention

The present invention relates generally to a personalized telephone signaling circuitry and device, and methods of constructing and utilizing same. More particularly, the present invention relates to a personalized telephone signaling device designed to be used in addition to a telephone, and the means required to electronically connect the device to a telephone, or alternatively between a telephone and a telephone outlet.

2. Description of the Relevant Art

The present inventors are unaware of any personalized telephone signaling devices similar to the claimed invention. However, there is a battery-operated toy available which is not a telephone signaling device but which has the external appearance or FIG. 1 herein. Such toy is marketed as "Chubby Bear" by the Alps Company.

SUMMARY OF THE INVENTION

The present invention provides a telephone signaling device comprising signaling means for providing audio and/or visual signals in response to electrical signals in a telephone line, and a telephone signaling circuit which is electrically connected to the signaling means, and to the telephone line for selectively activating and deactivating the signaling means in response to the electrical signals. The signaling device provided is extrinsic from the telephone.

The telephone signaling circuit comprises connecting means for connecting the circuit to the telephone line, a signal detecting portion for detecting ring-activating signals in the telephone line, for detecting if a receiving party has answered the phone, and for detecting if a calling party has hung up, and a driving portion for activating and deactivating the signaling means in response to detected signals.

The signaling means is preferably, although not necessarily, a toy figure with movable and/or sound-producing and/or light-producing features.

It is a principal object of the present invention to provide a personalized alternative to the signaling system associated with phone systems, i.e., loud ringing or buzzing.

Another object of the present invention is to provide a telephone signaling circuit for connecting a personalized telephone signaling means to a telephone.

It is yet another object of the present invention to provide a personalized telephone signaling device which quickly connects to any standard telephone and any telephone outlet.

Additionally, it is an object of the present invention to provide a personalized telephone signaling device which does not have to be disconnected from the telephone line in order to disabled.

It is a further object of the present invention to provide a personalized telephone signaling device in the shape of a toy, animal or human figure with movable and/or sound-producing and/or light-producing features.

Other objects, advantages and salient features of the present invention will become apparent from the following detailed description, which, when taken into conjunction with the annexed drawings discloses preferred embodiments of the present invention.

DETAILED DESCRIPTION OF THE PREFERRED EMBODIMENTS

Figure 1:
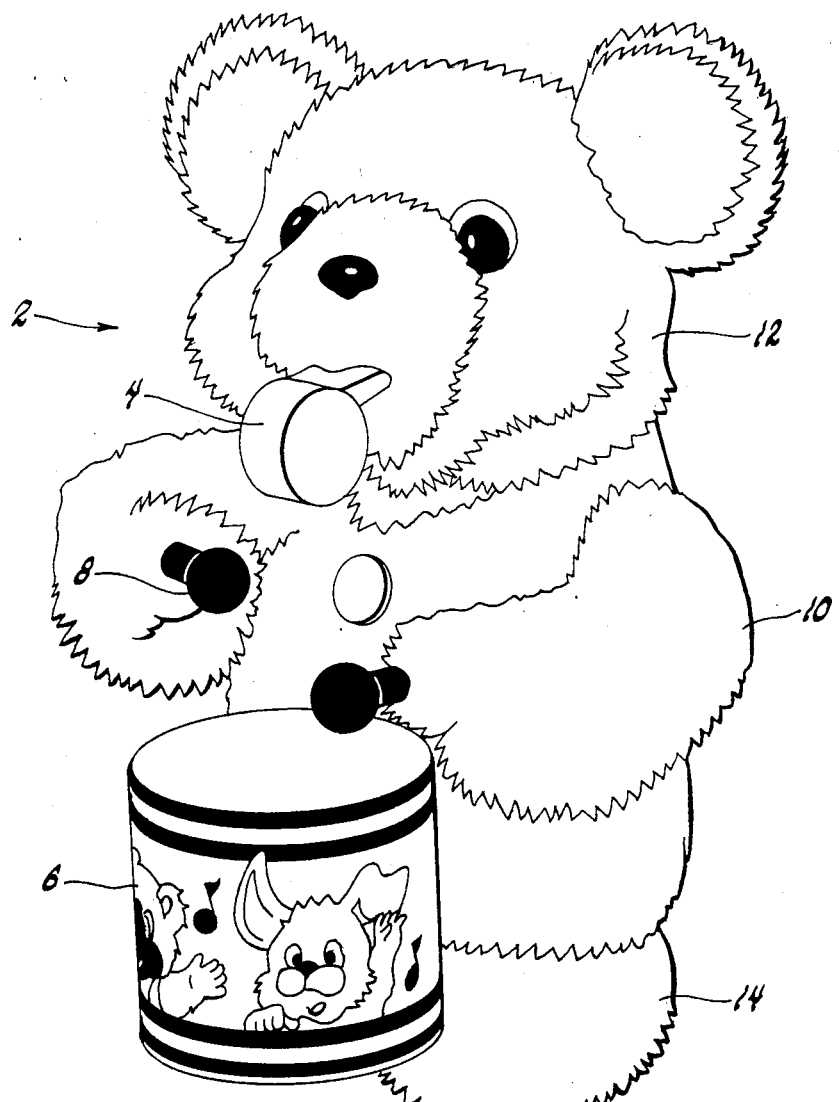
FIG. 1 illustrates a perspective view of a telephone signaling device in the shape of an animated toy figure in accordance with a first embodiment of the present invention.

Referring to FIG. 1, there is shown a personalized telephone signaling device indicated generally as 2. Preferably, but not necessarily, the telephone signaling device is in the shape of a toy, animal or human figure having movable and/or sound-producing and/or light-producing features. The telephone signaling device 2 is preferably, but not necessarily, a complete device having mechanical, electrical and aesthetic features.

Mechanical features of the telephone signaling device may include, but not exclusively, a central frame and moving members such as arms, legs, feet, head, doors, wheels, etc. Also included among the mechanical features are sound-producing instruments or mechanisms, such as whistles, bells, drums, horns, music boxes, record or tape playing means etc.

Figure 2:
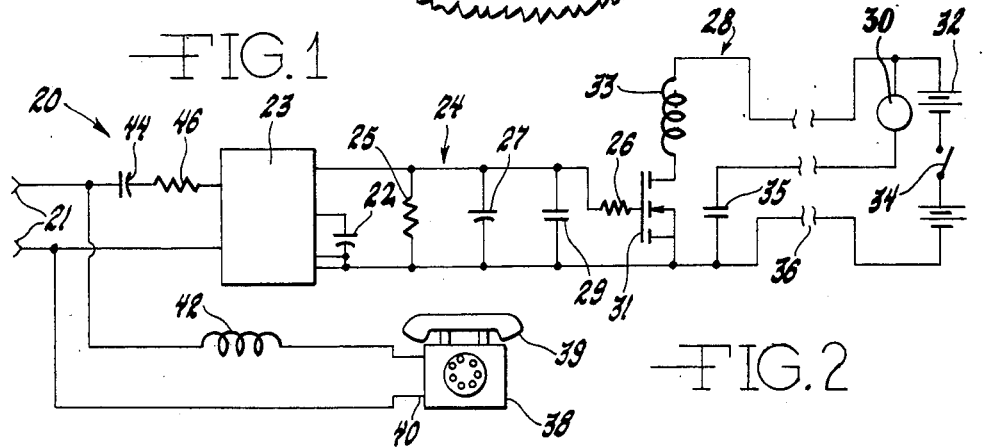
FIG. 2 illustrates a telephone signaling circuit in accordance with the present invention.

Electrical features may include, but not exclusively, a power source, motor or driving means, light-producing elements, sound-producing elements, appropriate connecting means and a telephone signaling circuit 20 (see FIG. 2).

Preferred, but not exclusively, power sources are batteries, solar cells, transformers and electrical adaptors for electrical outlets.

Preferably, but not necessarily, the personalized signaling device 2 will include a manual ON/OFF switch 34 (see FIG. 2) whereby the signaling device can be disabled without having to disconnect it from the telephone line.

Aesthetic features may include, but not exclusively, a soft grippable exterior, bright attractive colors, etc.

Referring back to FIG. 1, the personalized telephone signaling device shown is a toy bear. External features of this bear include a whistle 4, a drum 6, drumsticks 8, moving arms 10, moving head 12, moving feet 14, a soft fuzzy covering material, and appropriate connectors (not shown) for connecting the bear between a telephone 38 (see FIG. 2) and a telephone outlet (not shown).

The internal features of this bear include a central frame, electrical power source 32 (see FIG. 2), a motor or driving means 30 (see FIG. 2) including appropriate electrical connecting means, appropriate mechanical connecting means allowing movement of the above-discussed parts, and the telephone signaling circuit 20 interfaced or otherwise electronically connected with the driving means 30.

In use, the telephone signaling device 2 would be connected between a telephone 38 (see FIG. 2) and a telephone outlet using preferably, but not necessarily, conventional plug-in telephone adaptors.

Upon receiving a ring-activating signal, the telephone signaling circuit 20 would activate the driving means 30 whereby the head 12 would rock back and forth forcing air through whistle 4, the arms 8 would move up and down thereby contacting drum 6 with drumsticks 8, and feet 14 would turn the device from side to side. The combination of such movements and sound created thereby would pleasantly inform a receiving party that he or she should answer the telephone 38.

Once the receiving party has answered the telephone 38, telephone signaling circuit 20 deactivates the driving means 30 whereby the signaling device 2 is turned off.

Similarly, if the receiving party is not present to answer the telephone 38 and a calling party hangs up, telephone signaling circuitry 20 will deactivate the driving means 30 and turn off the signaling device 2.

If signaling device 2 is manually disabled by turning the ON-OFF switch 34 to the OFF position or if the electrical power source fails, i.e., batteries die, a short circuit in the electrical connecting means, etc., the connection between the telephone 38 and the telephone outlet will not be affected because this connection is through the telephone signaling circuit 20.

Similarly, a sounding mechanism integrally included with the telephone is not affected by the presence of the signaling device 2. The integral sounding mechanism may be used in addition to the signaling device 2, or it desired may be turned off so that only the signaling device 2 is operative.

Referring to FIG. 2, there is shown the telephone signaling circuit 20 of the telephone signaling device 2. The signaling circuit 20 may include, but not exclusively, means 21 and 40 for connecting the signaling circuit to the telephone line outlet and the telephone 38, respectively, and means for activating and deactivating the driving means 30 of the telephone signaling device 2.

Means for activating and deactivating the driving means 30 may include, but not exclusively, a signal detecting portion and an activating portion.

Preferably, but not exclusively, the signal detecting portion includes a ring-activating signal detecting component 23, capacitor 44, resistor 46 and induction coil 42. The ring-activating signal detecting component 23 may, but not necessarily, be an integrated circuit chip.

Preferably, but not exclusively, the activating portion includes timing components indicated generally as 24, driving components indicated generally as 28 and an interface means 36.

The timing components 24 may include, but not exclusively, a resistor 25, capacitor 21 and 27 and a relay contact 29.

The driving component 28 may include, but not exclusively, a resistor 26, MOSFET 31, induction coil 33 and relay contact 35.

Interface means 36 connects the telephone signaling circuit 20 with the driving means 30 of the telephone signaling device 2.

In use of the preferred embodiment depicted by FIG. 2, a ring-activating signal would come through connecting means 21 to the signal detecting component 23 and to the telephone 38. The component 23 would then generate a series of electrical pulses which pass across elements 22, 25, 26 and 27 whereby MOSFET 31 is turned on which activates relay 35 and thereby also activates driving means 30.

When a user lifts the receiver 39 of the telephone 38, coil 42 is energized whereupon contact 29 closes and shorts capacitor 27 to ground which turns MOSFET 31 off and thereby deactivates driving means 30.

Similarly, if the calling party hangs up, capacitor 27 discharges through resistor 25 turning the signaling device 2 off after less than one complete ring cycle.

Although various advantageous embodiments have been chosen to illustrate the invention, it would be understood by those skilled in the art that various changes and modifications can be made therein without departing from the spirit and scope of the invention as defined in the appended claims.

We claim:

1. A telephone signaling circuit for use in a telephone signaling device, comprising:
   first means for connecting the signaling circuit to a telephone line; and
   second means electrically connected to said first means for selectively activating and deactivating said telephone signaling device;
   said telephone signaling device including a toy, animal or human figure with movable and sound-producing features;
   said telephone signaling device including power supply means;
   said telephone signaling circuit being extrinsic from its associated telephone.

2. A telephone signaling circuit according to claim 1, wherein:
   said second means comprises a signal detecting portion for detecting electrical signals on said telephone line; and
   an activating portion operatively connected to said signal detecting portion which activates and deactivates said telephone signaling device in response to the signals detected by said signal detecting portion.

3. A telephone signaling circuit according to claim 2, wherein;
   said first means includes adaptors for quickly and easily connecting said telephone signaling circuit between a telephone line outlet and said telephone.

4. A telephone signaling device, comprising:
   signaling means provided as a toy, animal or human figure with movable and sound producing features;
   a telephone signaling circuit operatively connected to said signaling means for selectively activating and deactivating said signaling means; and
   power supply means;
   said telephone signaling device being extrinsic from its associated telephone;
   said signaling means further includes light-producing features.

5. A telephone signaling device according to claim 4, wherein:
   said telephone signaling circuit comprises;
   connecting means for connecting said circuit to a telephone line;
   a signal detecting portion for detecting electrical signals on said telephone line; and
   an activating portion operatively connected to said signal detecting portion which activates and deactivates said telephone signaling device in response to the electrical signals detected by said signal detecting portion.

6. A telephone signaling device according to claim 5, wherein:
   said connecting means includes adaptors for quickly and easily connecting said telephone signaling device between a telephone line outlet and said associated telephone.

7. A telephone signaling device according to claim 4, wherein:
said signaling means includes a toy, animal or human figure with light-producing features.

8. A telephone signaling device according to claim 6, wherein:
said signaling means further includes light-producing features.

9. A telephone signaling device according to claim 4, wherein:
said telephone signaling device includes a switch for disabling said device when so desired.

10. A telephone signaling device according to claim 6, wherein:
said telephone signaling device includes a switch for disabling said device when so desired.

11. A telephone signaling device according to claim 7, wherein:
said telephone signaling device includes a switch for disabling said device when so desired.

12. A telephone signaling device, comprising, in combination:
a telephone line terminating in a first connector;
a telephone having a telephone cord terminating in a second connector which conventionally is adapted to mechanically and electrically mate with said first connector;
a telephone signaling device electrically and mechanically interconnected between said first connector and said second connector; and
said telephone signaling device including a toy, animal or human figure with movable and sound-producing features to alert a user that a telephone call is incoming.

13. A telephone signaling device comprising, in combination:
a telephone;
a telephone signaling device extrinsic to said telephone and electronically connected to said telephone; and
said telephone signaling device including a toy, animal or human figure with movable and sound-producing features to alert a user that a telephone call is incoming.

* * * * *